J. R. OLIVER 1,697,999

STOPPING AND STARTING MECHANISM FOR SHOE STITCHING OR OTHER MACHINES

Filed May 19, 1927    6 Sheets-Sheet 4

Fig. 4.

Inventor.
John Roger Oliver
by Rogers, Kennedy & Campbell
Attys.

Jan. 8, 1929.  1,697,999
J. R. OLIVER
STOPPING AND STARTING MECHANISM FOR SHOE STITCHING OR OTHER MACHINES
Filed May 19, 1927  6 Sheets-Sheet 5

Fig. 5.

Inventor.
John Roger Oliver
by Rogers, Kennedy & Campbell
Attys.

Jan. 8, 1929.  
J. R. OLIVER  
1,697,999  
STOPPING AND STARTING MECHANISM FOR SHOE STITCHING OR OTHER MACHINES  
Filed May 19, 1927  
6 Sheets-Sheet 6

Inventor.  
John Roger Oliver  
by Rogers, Kennedy & Campbell  
Attys.

Patented Jan. 8, 1929.

1,697,999

UNITED STATES PATENT OFFICE.

JOHN ROGER OLIVER, OF MEDFIELD, MASSACHUSETTS, ASSIGNOR TO REECE SHOE MACHINERY COMPANY, OF BOSTON, MASSACHUSETTS, A CORPORATION OF MAINE.

STOPPING AND STARTING MECHANISM FOR SHOE-STITCHING OR OTHER MACHINES.

Application filed May 19, 1927. Serial No. 192,622.

This invention is a novel stopping and starting mechanism for shoe stitching or other machines and is herein shown applied, as an example, to the so-called welt-and-turn stitching machine, although it is applicable to various other types of high speed power driven stitching machines, such as the well known buttonhole sewing machine, or to other power driven machines wherein it is required to bring the main or operating shaft to rest in a definite position without undue shock.

The features of the present invention, while they might be used in various stopping and starting mechanisms, are shown applied as improvements to the mechanism illustrated in my prior Patent No. 1,532,634 granted April 7, 1925; and as many features of the general mechanism and mode of use may be similar to the prior patent certain details will be omitted herefrom which may be ascertained by reference to the prior patent.

The general objects of the present invention include the stoppage of a high speed power driven machine with substantially no shock or impact and yet in a manner to afford a definite final position of the shaft, which is of essential importance in many types of machine; also to afford improved strength and durability, and less likelihood of wear and breakage; also simplification of structure and reduction in number of springs and other parts employed. A particular object of the present invention is to quicken the action of stopping the machine after such action has been initiated by the letting up of a pedal or otherwise, so as to minimize the loss of time between the pedal action and the removal of the shoe or work from the machine. A further object is to improve the resetting of the mechanism in preparation for restarting. Other and further objects and advantages of the present invention will be explained in the hereinafter following description of one form or embodiment of the invention, or will be apparent to those skilled in the subject. To the attainment of the objects and advantages referred to the present invention consists in the novel machine, mechanisms, combinations, arrangements, devices and other features herein illustrated or described.

In the accompanying drawings

While the essence of the invention will be set forth in the appended claims the preferred mode of operation may be preliminarily stated. The machine is shown as a power driven welt sewing machine adapted to stitch around a shoe for attaching the welt to the upper and to the lip of the insole. When the end of the seam is reached the workman will operate the pedal or other controlling member which puts the stopping mechanism into action. The timing of this might be automatic with some types of machines, but in a shoe stitching machine the stopping action is preferably initiated by the operating pedal. This pedal is held down during stitching and when let up causes first the unclutching of the main or stitching shaft from the power drive. Friction for stopping the machine is applied in the same action. This may be a brake and it remains in effect until the actual stoppage of the shaft. The friction can be sufficiently powerful to afford a short period of stoppage and the action will be without shock. The stopped position however will vary at different operations in other words is indeterminate. With this invention the shaft, after such stoppage, is automatically restarted and turned over at a relatively slow speed to the desired final stopping position. A definite position is important with such stitching machines so that the needle will be out of the work and thus avoid the manual operation of turning the shaft to such position. The supplemental or slow drive is caused to take place by reason of a certain reaction occurring at the end of the first stoppage. During the operation of friction, bringing the shaft to rest, the connected parts are under continuous strain. At the instant of stoppage a slight reverse rotation or kicking back of the shaft occurs. This is due to the cessation of the frictional drag and is herein referred to as a reaction, and is utilized to operate or trip the control of the supplemental or slow driving mechanism. A latch or trigger or similar mechanical device is thrown by the reaction movement and this brings into effect the slow drive, which is a power drive having only a fraction of the speed of the full drive, so that substantially no inertia is involved in the slow rotation which brings the shaft to the desired final position. When the final stopping position is reached the slow drive in turn is thrown out and the shaft is again stopped, thus completing the sequence of actions. The parts are preferably at this time reset for the next succeeding operation, so that the machine is in readiness to be restarted by the mere depression of the pedal or can be turned by hand.

The machine illustrated in the drawings has a heavy base 14 above which extends a post 15 usual in this type of machine, carrying at its top a head or frame 16 which supports the stitching mechanism. On the base is shown a source of power in the form of an electric motor 17 having two pulleys. The main pulley 18 is connected by a belt 19 to the pulley on the main shaft as will be described, for main driving purposes. A second pulley 20 is shown on the shaft of the motor, this operating through a belt 21 which extends to the mechanism by which the stitching shaft is turned over slowly after the initial stoppage. The base also supports a controlling lever or pedal 22 which is normally lifted by a spring 23 but is to be held down by the foot of the workman during stitching, a rod 24 extending from the pedal to the mechanism which is to be controlled thereby.

Figure 1:
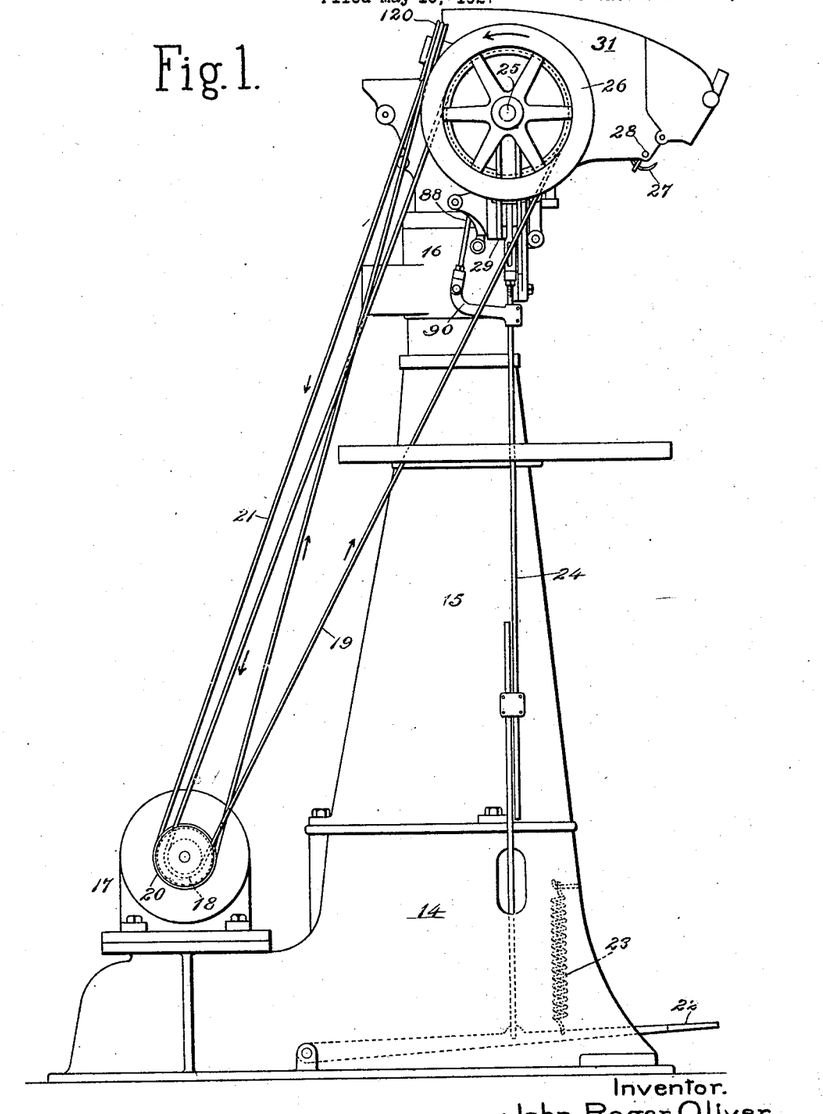
Fig. 1 is a general left elevation of a shoe stitching machine embodying the stopping and starting mechanism of the present invention, with the parts in stopped position.

The main or stitching shaft 25 is shown as having a hand wheel 26 at its left end, as is usual. The usual stitching instruments may be driven from the main shaft, but are here not fully shown because forming no novel part of the present invention. Fig. 1 however shows the usual curved needle 27, the carrier of which swings on a pivot 28 and is oscillated by any suitable mechanism, for example by links and levers driven from cams or cranks on the main shaft. It will be understood that the shoe is held in inverted position and is fed transversely of the plane of the needle during the stitching, the needle at each advancing stroke penetrating the welt strip, the shoe upper and the insole lip, then receiving a loop of thread from suitable looper mechanism, not shown, and retracting, the thread being controlled by a take-up, not shown, and other usual instruments to draw each stitch tightly to the work. The details of such mechanism may be ascertained by reference to the various prior patents directed to the sewing machine features of invention.

The motor 17 may have for example a rotary speed of 1760 R. P. M. such that through the belt 19 a stitching speed of 550 stitches, more or less, per minute will result; while the slow drive connections, operated by the belt 21, may turn the shaft at a much lower speed, for example, the negligible speed of 125 R. P. M. in bringing the shaft to final position. The driving connections may be such that when the pedal and pedal rod are depressed they may have the function of regulating the running speed, namely by manipulating the pedal to admit more or less slippage in the main clutch, to be described, so as to speed up or slow down the stitching speed according to the difficulty of the work in hand. When the pedal is let entirely up the present invention comes into action, the first action being the opening of the main clutch and the applying of a powerful friction brake for stopping the shaft as already described.

The head of the machine, at its left end, carries a fixed bracket 29, the left extremity of which forms a bearing for the operating shaft 25; and this head bracket and its overreaching arm 30 carrying the stopping mechanism to which the pedal rod 24 extends. The head also carries a vertical frame plate 31 which, with other frame parts, supports the stitching mechanism.

Figure 3:
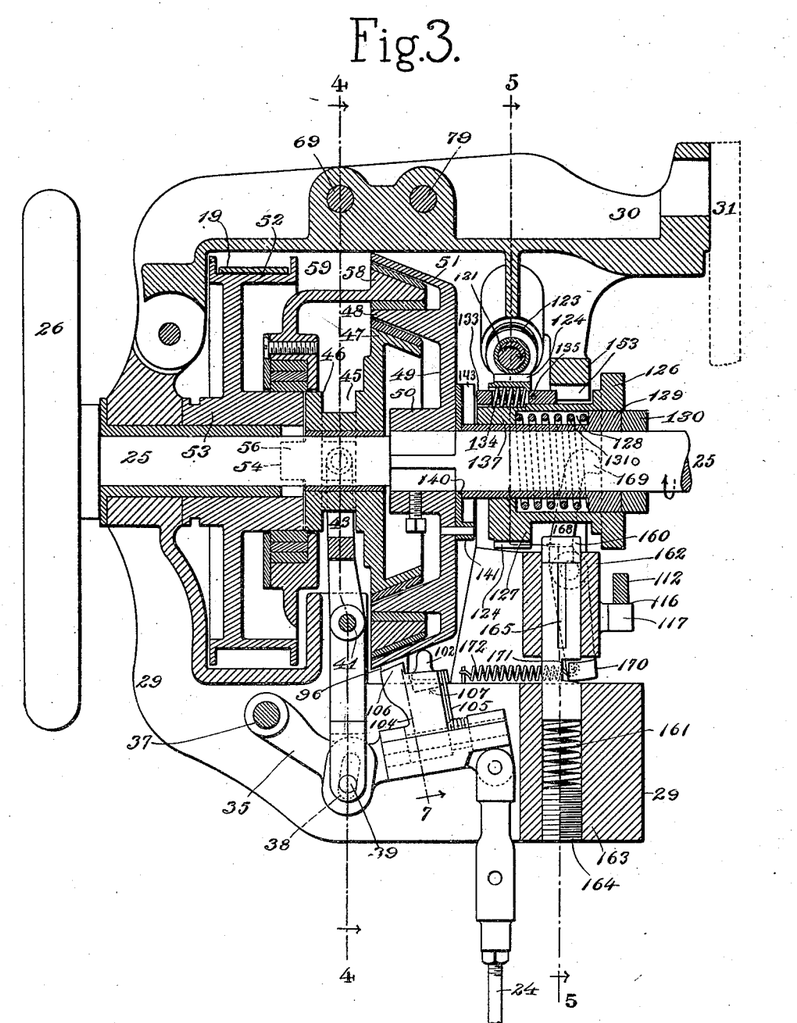
Fig. 3 is a substantially central vertical section looking from the front, also in stopped position.

The pedal connections to the main drive will now be described. The upper end of the pedal rod 24 is connected with the free end of a swinging lever 35 as best shown in Fig. 3, the upward movement of which may be limited by a stop 36. The lever is fulcrumed at 37. An enlarged portion of the lever is formed with an inclined cam or slot 38, seen also in Fig. 4, this being engaged by a follower or pin 39 mounted in the forked lower end of an upright lever 40 pivoted at 41 to an upward frame extension 42. The lever 40 is the main clutch lever and its upper end is forked at 43 and carries a pair of opposite blocks 44 engaging in the groove 45 of a hub 46 constituting part of the driving clutch member or cone 47. By this arrangement the depression of pedal throws the driving cone toward the right to apply power to the shaft, while the complete letting up of the pedal throws the cone to the left to disengage the drive. The cone 47 is shown located within the opposing or driven cone 48 formed on a disk or web 49, the hub 50 of which is mounted to turn with the driven shaft which is shown squared at this point for the purpose. The disk or web 49 which turns with the shaft is utilized not merely for driving purposes, as described, but also for braking purposes, for which the disk is shown provided with a second or exterior cone 51 which will be further referred to below.

The driving power is transmitted to the interior driving cone 47 by any desired connections such as the following. What may be termed the drive pulley 52 is mounted loosely upon the main shaft or upon a sleeve surrounding the latter, the flat rim of this pulley receiving the belt 19 driven from the base of the machine. The hub 53 of the pulley is formed with axial slots 54 engaged by projections 56 extending leftward from the hub 46 of the driving cone. In this way the rotation of the drive pulley is constantly transmitted to the clutch cone while permitting axial movement of the latter. When the clutch is closed the power device at the base of the machine transmits through the belt, pulley, projections, hub and driving cone, to the driven cone and main shaft.

Figure 2:
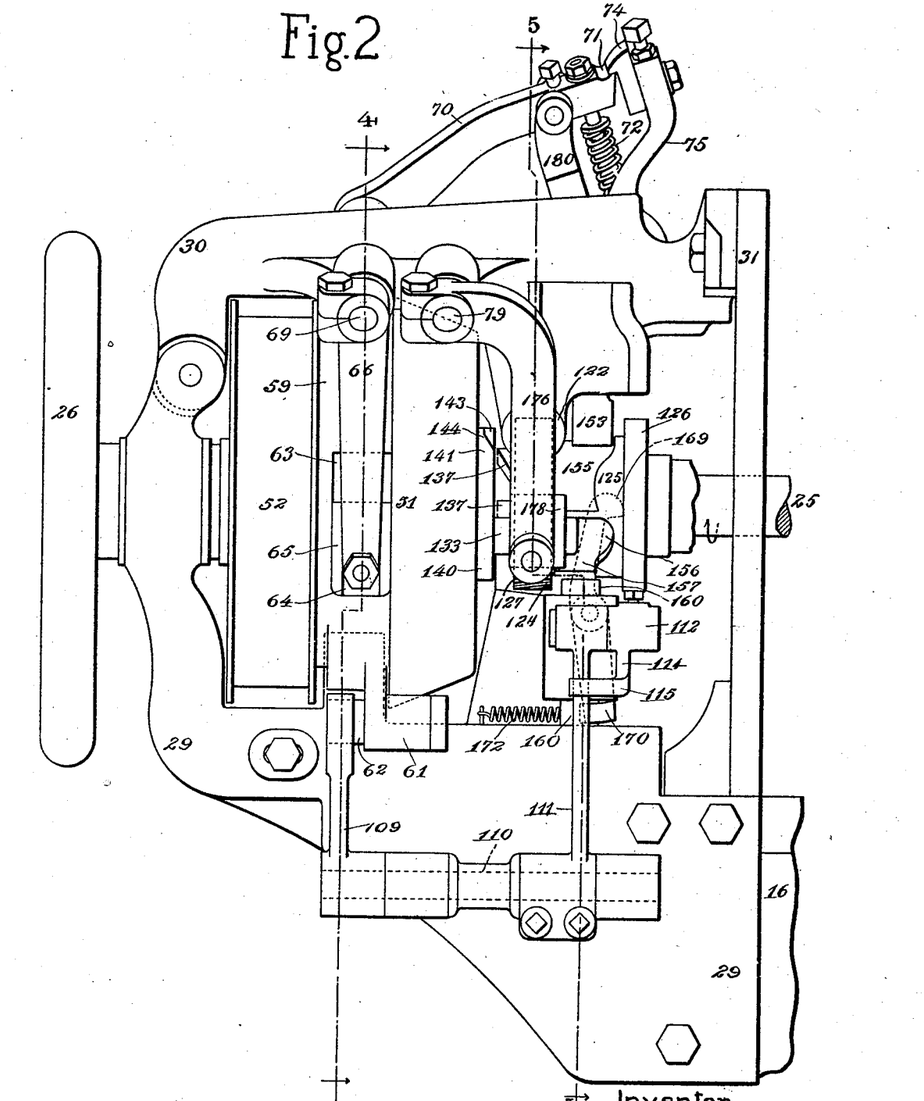
Fig. 2 is a front elevation of the mechanism at the top of the machine involved in the invention.
Figure 4:
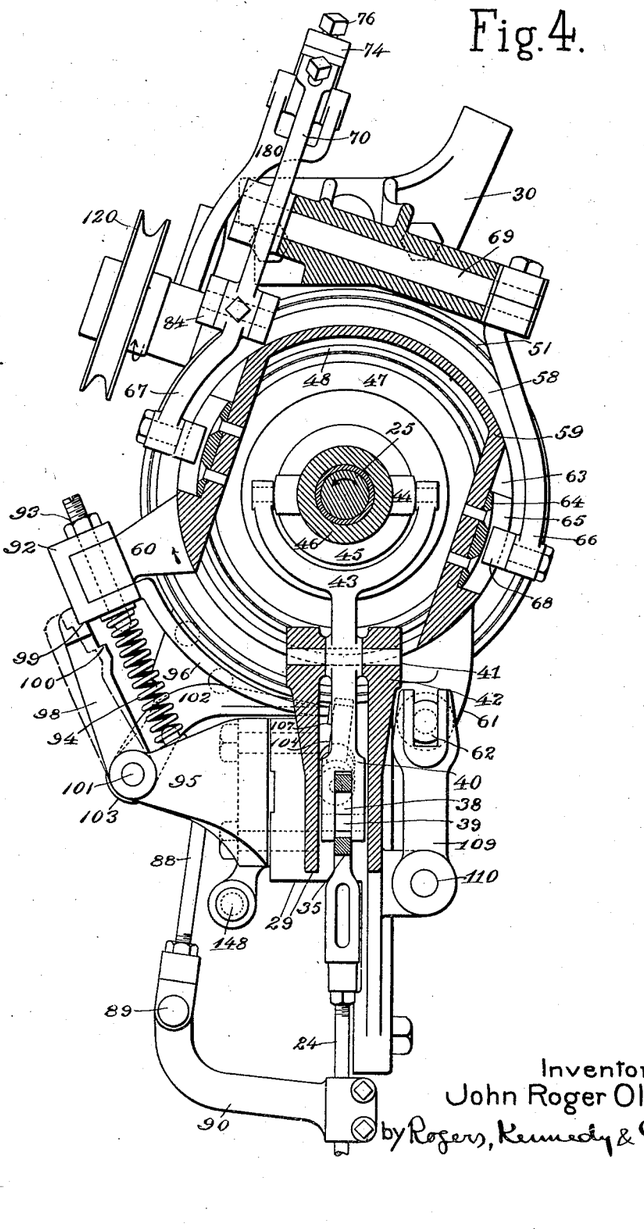
Fig. 4 is a transverse section taken substantially on the line 4—4 of Fig. 2 or 3, looking from the left.

The braking means is shown as a cone 58 engaging within the outer cone 51 turning with the main shaft as already stated. The braking cone is used herein both for the initial stoppage of the machine and subsequently for the final stoppage. The braking cone 58 is arranged to have a slight yielding movement in a rotary direction so that it may give under the strain during the initial braking, at the conclusion of which it will react sufficiently to start the train of mechanism controlling the supplemental or slow drive. The brake cone may conveniently be mounted on a supporting carrier shown in the form of a housing 59, indicated in Figs. 2, 3 and 4, substantially surrounding the central parts and main shaft, with however a gap or opening at the lower side of the housing to accommodate certain fixed and movable parts as seen in Fig. 4. While the brake cone itself is preferably annular, the housing is preferably broken away as described, its cross section taking substantially the form of an inverted U with flattened sides. At the lower rear portion of the housing is shown a lug 60 extending outwardly to the resilient and other means controlling the yielding movements of the housing and brake, while at the lower front portion the housing is formed with a downwardly extending lug 61, part of which consists of a stud 62 engaging with mechanism subsequently to be described. The flattened portions of the inverted U of the brake housing form peripheral recesses 63 at the front and rear respectively, each of these recesses accommodating a hardened and grooved piece 64 having side flanges 65 enclosing the grooves.

The applying and removing of the brake may be effected by a brake lever which comprises opposite downwardly extending arms 66 and 67 carrying studs 68 engaged in the grooves of the flanged pieces 64 of the brake housing, so that the swinging of the brake lever will move the brake axially of the main shaft. The two downward arms of the brake lever are shown both connected to an oscillating shaft 69 mounted in the overhanging bracket 30. The rear arm 67 is shown as extended upwardly above its fulcrum or shaft by an extending arm 70 through which the movements of the brake lever and brake are controlled. The upper extremity of the extension 70 is formed with a hardened point 71 to cooperate with a latch to be described. Near its upper end the lever 70 has connected to it a strong compression spring 72 having a tendency to press up on the extension and thereby force the brake cone 58 toward the right to apply the brake and stop the machine.

The brake lever extension 70 is normally pressed up by the brake spring 72, but held down by a brake latch 74, so that the brake is ineffective or open. The latch 74 is carried on a trip lever 75, and is adjustable thereon by screws 76 to determine accurately the open position of the brake. The trip lever 75 is pivoted at 77 upon a carrying lever or main latch lever 78 fulcrumed at 79, the compression spring 72 being preferably arranged to force downwardly on the carrier lever 78 as well as to force upwardly on the brake lever extension 70. The operation of the carrier lever will be described later. The trip lever 75 is pressed into engaging position by a spring 80, but may be thrown out of engagement to release the brake for the preliminary stoppage, for example as follows. The trip lever has a rightward extension 81 constituting of it a bell crank lever, and this extension carries a bolt 82 pressed longitudinally outward by a spring 83. The bolt is shown depressed by an exterior member 85 contacting the nose of the bolt, but the bolt normally stands out in the path of said member, limited by stop 83$^a$.

Figure 6:
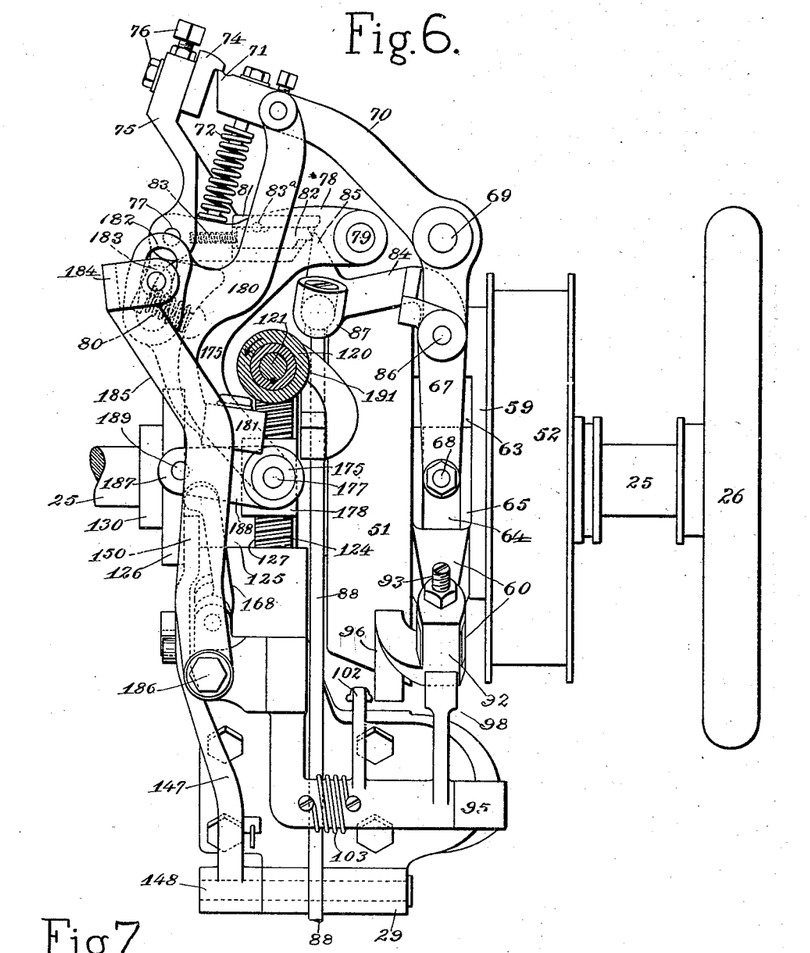
Fig. 6 is a slightly inclined rear elevation taken partly in section on the line 6—6 of Fig. 5.

The initial throwing of the trip lever to apply the brake may be effected by the lifting of the pedal rod 24, for example as follows. As seen in Fig. 6 a swinging lever 84 is arranged with an upward extension or finger 85 positioned to strike the bolt 82 and trip the lever 75 when the pedal rod rises. The lever 84 is shown fulcrumed at 86 upon the brake arm 67, and the swinging or left end of the lever is provided with a universal joint or pivot 87 engaged by a vertical rod 88 which is substantially a part of the pedal rod 24 because pivoted at 89 to a rearwardly extending bracket 90 clamped upon the pedal rod. By this arrangement when the pedal is depressed to operate the machine the finger 85 drops below the bolt 82, and when the pedal is let up the finger lifts the bolt and thus trips the lever, which releases the brake lever so that the strong spring 72 applies the brake and stops the machine.

During the braking action certain parts yield with the frictional pressure, subsequently reacting or returning to normal, and these may be termed the reaction parts. The lower rear lug 60 of the brake housing 59 is machined at its outer extremity to receive what may be termed a reaction block 92; held to the lug by a connecting bolt 93. A spring 94, under compression, extends between the reaction block and a fixed bracket 95, this reaction spring normally holding the block and housing in the position shown, and returning them to such position after the yielding which occurs during the braking. The reaction block 92 is formed or extended into a curved finger 96 which takes part in certain control actions to be described.

Figure 7:
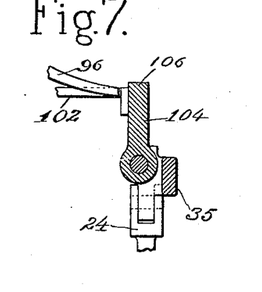
Fig. 7 is a detail view of certain parts seen from the left and partly in section on the line 7—7 of Fig. 4.

In connection with the described reaction parts is shown an arm or guard 98. This is shown in its normal or guarding position in Fig. 4 in full lines, while the dotted lines indicate its retracted position in which it is inoperative and allows the reaction parts to operate, in other words allows the block 92 to press downwardly and compress the spring 94. The guard 98 has an upper shoulder 99 adapted to hold the reaction parts inoperative as shown and may have a second or lower shoulder 100 to limit the amount of yielding or compression of the spring 94. The guard arm is fulcrumed at 101 on the bracket 95 and it has a forwardly extending finger 102 lying adjacent to the finger 96 as seen in Figs. 4 and 6 and in Fig. 7. A spring 103 presses the guard toward the block.

The movements of the guard 98 are controlled by a latch 104 shown mounted on the pedal controlled lever 35, so that it partakes of the up and down movements of the pedal. A coil spring 105 is shown acting to press rearwardly on the latch, as indicated by the arrow in Fig. 7. The latch cooperates with the two fingers 96 and 102, its function being to elevate and hold elevated the finger 102 at certain times so as to hold the guard 98 inoperative, while the finger 96 pressing forward can throw the latch to release the other finger and the guard. The latch is shown with an upward extension 106 cooperating with the finger 96 and a rearward extension 107 cooperating with the finger 102. The arrangement is such as to give substantially the following operation. When the pedal is depressed the guard latch 104 is pulled down from the Fig. 7 position, and the spring 105 throws it rearwardly, that is to the left in Fig. 7, so that the extension 107 comes beneath the finger 102, the finger 96 being retracted. When the pedal is let up for the stoppage of the machine the extension 107 lifts the finger 102 and thereby throws rearwardly the guard 98 and releases the reaction block 92 so that the stopping friction can force downwardly the block and compress the reaction spring, the shoulder 100 limiting this movement. This yielding action throws forwardly the finger 96 which is part of the reaction block, and the finger thrusts forwardly the latch 104, so that the extension 107 is removed from beneath the finger 102, thus rendering the guard 98 free, so that after the first stoppage, and when the reaction occurs, the reaction block 92 upon returning to normal position, will be engaged and held there by the upper shoulder 99 of the guard.

The throwing into action of the slow drive following the frictional stoppage and reaction may be effected by any sort of device or latch under the principles of said prior patent. Herein the following novel devices are shown, by which the reaction movement directly effects the release or unlatching of the parts which are to cause the clutching of the slow drive. The stud 62 on the lug 61 at the forward side of the yielding brake housing 59 is shown engaging with the forked upper end of a lever arm 109 secured at the left end of a shaft 110 which carries at its right end an upward lever arm 111 through which the said trigger or main latch is operated. During the frictional stoppage the arm 109 is swung frontward, or to the right in Fig. 4 and on the reaction it returns to the normal position shown. This return movement or reaction, imparted to the other lever arm 111 is the movement which throws the part or latch which causes the engagement of the slow drive, the operative movement being indicated by the arrow applied to the arm 111 in Fig. 5. The arm 111 carries at its upper end a pivoted finger or pusher 112 which extends rearwardly to its acting extremity 113 and at its front end has a tail or downward extension 114 with an offset 115 adapted to contact the lever arm 111 as a stop. See also Figs. 2 and 6. The push finger 112 is shown formed with a cam portion 116 cooperating with a fixed stud or roller 117 by which during the rearward movement the finger is lifted, being subsequently restored on the forward return movement so as to be operative for another unlatching operation.

The release or latch operation by which the reaction engages the slow drive will be best described by passing at this point to the slow drive connections, and their mode of engagement and disengagement, returning subsequently to the control thereof from the push finger 112.

The power belt 21 extends to the pulley 120 of the slow driving connections. The pulley is mounted on a shaft 121, see Fig. 5, which carries a collar 122 at its forward end. At an intermediate point this fast turning shaft is provided with a worm 123 engaging a worm wheel 124 on a slow rotating drum 125. This important element or drum serves several functions, constituting in effect part of the slow driving clutch, also formed with cams taking part in the unclutching action, and other portions cooperating as will be described. The drum is formed with a right hand flange 126 and a left hand flange 127, the latter carrying the teeth constituting the worm wheel 124. The drum also is hollow, containing a recess 128 formed between the metal of the drum and an interior sleeve 129 which is confined on the shaft by a collar 130 pinned to the shaft 125. This recess contains a coil spring 131 under compression, the spring therefore constantly tending to move the drum toward the left, as will be clear from Fig. 3. It will be understood that the drum is continuously rotating in the same direction as the main shaft, but at much slower speed than full stitching speed.

Figure 5:
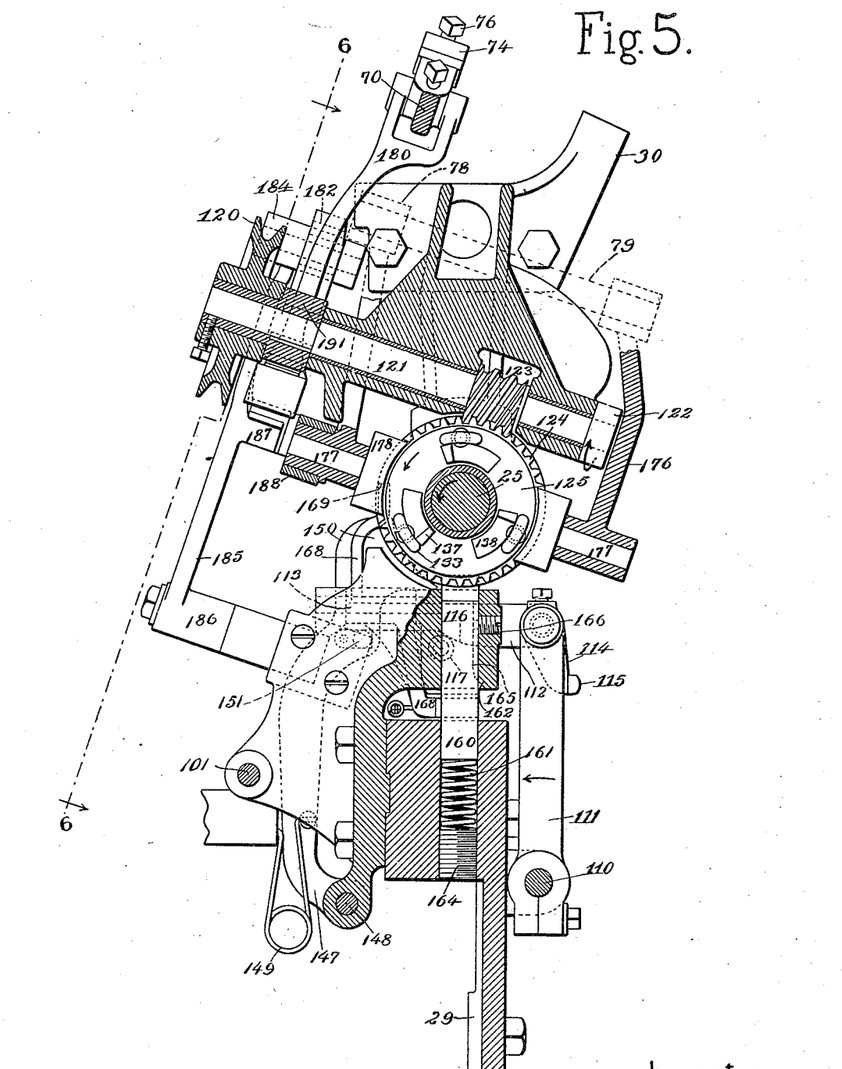
Fig. 5 is a transverse section taken substantially on the line 5—5 of Fig. 2 or 3, looking from the left.

The drum, when moved to the left engaged the slow drive, so that its own rotation is communicated to the shaft 25. This is preferably effected by a dog clutch giving a positive engagement, and preferably the engaging devices are in multiple, for example three of them spaced around the drum, so as to give an engagement with minimum loss of time, after the controlling latch has been thrown by the reaction already described. Thus the drum is shown as having its left flange 127 cut away at three points to receive three clutch dogs 133. Each dog is continuously pressed leftward into operative position by a confined spring 134 limited by a stop pin 135. The drum also, at its left end, is preferably provided with three rigid or unyielding clutch dogs 137 as seen in Figs. 3 and 5, each followed by a declining slant to ease the clutch engaging action. Each of the unyielding dogs 137 is intended to reenforce the adjacent yielding dog 133 and take the brunt of the clutching pressure. In each slow driving operation it is intended that only one of the yielding dogs shall make clutching engagement, the other two being forced to recede relatively to the right as the drum moves to the left, and in that way to take part in a cam control action as will be described. See also Fig. 2.

The driven clutch member 140 is formed with a rim flange 141 by which it is secured permanently to the main driving clutch disk 49 by pins 142, so as to rotate with the driven or operating shaft 25. The rim 141 is provided with a single notch 143 having an inclined entrance 144. The notch may be approximately 25° in extent and the engaging side of the notch adapted to contact with a yielding dog and an unyielding dog of the drum. By this arrangement, when the drum is thrown to the left, and as soon as driving engagement takes place, which will be within less than 120° of travel, the driven clutch member will be rotated by the dogs 133 and 137 engaging it. The other two yielding dogs however will be forced to recede, being pushed back relatively to the right by the rim 141 to render ineffective two of three controlling cam grooves of the drum as will be described, these cams having to do with the return or resetting movement of the drum and unclutching of the slow drive at the time of the final stoppage.

Normally the rotating drum 125 is held inoperative to the right by means of the main latch lever 147 fulcrumed at its lower end 148 and pressed by a spring 149 so that its enlarged curved upper end 150 is pressed into position adjacent the left face of the drum right flange 126. Figs. 5 and 6 best show the shape and position of this restraining lever 147 which restrains the drum and thus controls the engagement of the slow drive. The release is effected by the push finger 112 already described, which is thrown rearwardly by the reaction of the initial stopping parts. The rear extremity 113 of the finger is normally lower than as seen in Fig. 5, and when thrust rearwardly during the reaction it first contacts on a portion 151 of the lever 147, so as to throw the lever rearwardly, the finger then being cammed up by its cam 116 so as to ride over the contact 151 and release the lever, which is thereupon pressed forwardly towards normal position by its spring 149 which is not strong enough to resist the spring 94 by which the finger is thrust rearwardly. As soon as the arc-shaped head 150 of the latch lever 147 clears the flange 126 the drum is released and its spring 131 aided by brake spring 72 forces it leftward for the slow clutching engagement. Within a very short extent of rotation of the drum one of the three dogs will engage with the notch of the clutch driven member so as to start the driven shaft into rotation, and will turn it to an extent between 0° and 360° until the unclutching operation takes place. The leftward or engaging movement of the drum is preferably limited by a fixed stop 153 seen in Figs. 2 and 3, this being of curved shape and arranged to be contacted by the drum flange 126 during slow driving operation.

The unclutching of the slow drive at the desired position for final stoppage is preferably effected by the shifting back of the drum 125 to normal position, thus opening the clutch. For this purpose the drum is shown formed with three cams 155, one or the other of which is to be engaged by a follower by which the drum is to be cammed to the right against its spring pressure. The three cams consist of similar grooves around the periphery of the drum, each comprising an initial groove portion 156 adapted to receive the follower or bolt, and a camming portion 157, which is of such incline and extent as to give a slight overthrow in the return movement of the drum, and which is slanted outwardly so as to force the follower out of the groove. The three receding dogs 133, as already stated are arranged to be forced axially into the respective cam grooves to control the action of the latter. Thus normally all three cam grooves are operative because each initial portion 156 is of such extent as to receive the follower. But when the cam is at its leftward position, and the slow drive is clutched, only one of the three cams will be operative, because the rim flange 141 of the driven clutch member effects a thrust on the other two of the yielding dogs, so that these two will be thrust into the cam portions 156. The action will be clear from Fig. 2. When two of the receding dogs 133 are forced relatively to the right, each will occupy so much of the cam groove portion 156 as to exclude the entry of the follower therein. The drum therefore will continue to rotate until that cam groove comes opposite to the follower which has not been rendered inoperative by its yielding dog, on account of the dog entering the notch in the driven clutch rim. This arrangement insures the final throwing out of the slow drive, and the final stoppage, at the correct position in relation to the position of the rim notch, which in turn has a predetermined relation to the driven shaft and therefore to the needle and other stitching instruments.

The follower 160 is preferably in the form of a bolt normally pressed upwardly by a spring 161. The follower is mounted in suitable fixed bearings 162 and 163, the spring being shown confined in the latter by a threaded plug 164 by which the spring compression and action of the follower can be adjusted. To prevent rotation of the follower bolt it is shown formed with a vertical slot or groove 165, see Figs. 3 and 5, engaged by the extremity of a screw 166 threaded into the upper bearing 162.

For the purpose of holding the follower down in the normal position shown in the drawings and for releasing it to rise into operative position there is shown a follower control lever 168 centrally fulcrumed and having an upper head or contact portion 169 contacting and cooperating with the left face of the right flange 126 of the drum, so that the axial movements of the drum may swing the lever. The lower end of the lever has an offset flange or contact 170 which is arranged to swing into and out from a special notch 171 formed in the follower bolt. This notch has an inclined lower face so that when the lever contact 170 is thrown into normal position by its spring 172 there will be a camming action tending to throw the follower down slightly. It will be understood that the follower is cammed down by the drum cams 155, and that the supplemental camming action of the follower moves it down slightly further so as to prevent contact with the drum during normal operation.

Preferably the initial brake 58 is released during the slow drive and again applied for the final stoppage. While in some cases the slow drive might be effected against the friction of the brake this is generally undesirable, and a strong braking action is desirable. Therefore there is herein shown a means for retracting or releasing the brake during the period of slow drive, and then again applying the brake to stop the main shaft promptly on reaching the desired final position, such final stopping action being definite and reliable, and at the same time shockless, it being a frictional stop applied at the termination of the slow drive when the inertia of the rotating parts is negligible.

There has already been described the lever 78 which carries the trip lever 75. The trip lever has been tripped for the first stoppage, the brake spring 72 pressing powerfully upward on the brake lever extension 70 to apply the brake. The brake spring 72 extends between the lever 78 and the brake lever, pressing on both. The lever 78 is formed with a downward extension or arm 175 at the rear of the machine as seen in Fig. 6. The lever 78 is fixed to a fulcrum shaft 79 as indicated further in Fig. 5, and the front end of this fulcrum shaft is provided with a downward extension or arm 176 corresponding with the rear arm 175, the front arm shown also in Fig. 2. Each of the downward arms 175 and 176 is formed with a boss at its lower end carrying a swivel stud or shaft 177 on which is mounted a grooved block 178, the two grooved blocks straddling the left hand or toothed flange 127 of the drum. By this arrangement as will be clear from Fig. 6, when the drum moves into slow clutching position, this being a right hand movement as seen on the rear elevation Fig. 6, the lever 78 is allowed to swing so as to lower or let down the portion on which bears the brake spring 72. The brake spring thus assists this drum movement.

The grooved blocks 178, or rather that one of them which is on the rear arm 175 of the carrier lever 78, takes part in the removal of the brake action during the slow drive, for example through the following mechanism. A brake removing rod or link 180 is shown connected near the free end of brake lever arm 70, with its lower end formed into a contact head or thrust block 181 which may be pulled down to relax the brake. Near its middle, rod 180 is formed with a curved slot 182 in which operates a stud 183 carried by a yoke 184 formed at the upper end of a fore and aft swinging lever 185 fulcrumed at its lower end 186. The middle of this lever is formed into a lug 187. The grooved block 178 engaging the drum flange, or rather the hub which surrounds its swivel pin 177, carries the circular or strap portion of a link or rod 188 extending rightward and pivoted by pin 189 to the lug 187 of the throw lever 185.

By these means, when the drum moves leftward to slow clutching position (rightward in Fig. 6) the throw lever 185 is drawn in the same direction, and this forces the rod 180 to swing so that its thrust block 181 is forced beneath a collar 191 on the worm shaft 121. This collar not merely cams down the thrust block, but being keyed on its fast rotating shaft, takes an active part in drawing the block along and causing it to ride under the collar. In this way the block and rod are pulled forcibly down, this swinging the brake lever arm 70 and removing the brake as the slow drive engages. When the drum returns to unclutch the slow drive this retracts the thrust block and allows the rod 180 to rise so that brake spring 72 again applies the brake for the final stoppage.

It is very desirable that after the final stoppage and before the restarting of the machine the brake should again be removed, so as to leave the machine free to be turned over by hand or for adjustment or other purposes. The illustrated embodiment of the invention comprises means for finally removing the brake, and this arrangement is such moreover as to apply again the brake latch 74 to the point 71 of the brake extension lever. It will be noticed that the extremity of said lever below the latching point 71, is inclined, so that it is able to cam away the brake latch 74 until the latch is able to snap in over the point. This enables the brake to be removed and relatched as follows. As the drum returns to normal the latch 74 rises to normal. At the end of the operation the drum has a slight overtravel, as stated, and this lifts the latch abnormally. It is thus cammed away by the point 71 until it snaps in over the latter. The return of the drum to normal brings down the latch and with it the brake lever, so removing the brake and leaving it latched ready for the next stopping operation.

The complete operation may now be reviewed. After stitching a given seam or performing other work on any power driven machine which is to be brought to rest in a predetermined final position, the pedal is let up, this disconnecting the power drive by withdrawing the driving clutch cone 47 from the driven cone 48. The let up of the pedal and pedal rod immediately accomplishes certain other actions. Thus the rear rod 88, attached to the pedal rod, effects the throwing of the trip lever 75, which unlatches the brake lever, so that the brake spring 72 puts the brake 58 into effect. At the same time the lift of the pedal rod swings the lever 35 to which the top of the rod is pivoted, and this lever, carrying the latch 104, thus effects the lifting of the finger 102 of the guard 98 of the reaction block 92. If in Fig. 7 we imagine the latch 104 depressed with the pedal and then lifted it will be seen that the contact 107 will lift the finger 102, and so retract the reaction guard, and free the reaction parts for their yielding and reaction movements. During the braking action the brake, and its housing 59, with connected lugs 60 and 61, and the reaction block 92 yield, the spring 94 compressing, and this movement being limited by the shoulder 100 of the guard 98. One immediate effect of this yielding swing is that the finger 96 of the block 92 presses the latch 107 from the finger 102 so as to permit the latter to descend, thus freeing the guard 98 for its subsequent guarding action. The machine next stops with its shaft in an indeterminate position. The compressed reaction spring 94 immediately expands and throws the block 92 up to the normal position shown where it is at once locked by the guard 98. This reaction movement involves the turning of the entire brake housing and connected parts, including the lug 61 at the front. This lug moving rearwardly operates through its stud 62 to throw the lever system 109, 111 rearwardly, the arm 111 forcing rearwardly the push finger 112. The movement of this push finger first throws or trips the main or slow drive latch lever 147 rearwardly, the finger being then cammed up and released until restored by the next operation. The slowly rotating drum 125 being thus released or tripped by the rearward movement of its latch or trip lever 147 is moved immediately to the left to bring about the engagement of the slow drive clutch. The leftward movement of the drum effects certain actions. Thus through the block 178, link 188, lever 185 and rod 180 the brake lever arm 170 is depressed and the brake released, so that the slow drive will be unimpeded by the brake. The leftward movement of the drum also swings the lever 168 which controls the cam follower 160, the lever being swung in a manner that will be clear from Figs. 2 and 3 to remove the contact 170 from the notch in the follower, thus permitting the folower to rise, and at the proper time to enter one of the three cam grooves of the drum. The slow drive continues for an extent between 0° and 360° depending on the exact point of its engagement, in other words depending on the point at which the shaft has been stopped in the first stopping action, since the shaft has to be turned forwardly at the slow speed to the exact required final position, in the case of a sewing machine with the needle out of the work, the thread released, etc. By appropriate reversals of structure and action the slow drive could, if desired, be caused to act in the opposite direction to, rather than the same direction as, the main drive. At the time of the slow clutch engagement chance has selected one of the yielding dogs to enter the notch in the driven clutch member. The cam groove corresponding to this yielding dog will remain operative while the other two cam grooves will be rendered inoperative by the corresponding dogs entering the grooves and preventing the follower from engaging therewith. Rotation therefore will continue until the selected cam groove comes above the follower, whereupon the latter will rise and enter the groove portion 156. The immediate result of this engagement is that the cooperation of the cam and follower forces the drum to move to the right or away from its clutch engagement, so that as soon as the clutch elements are disengaged the drive will cease; this rightward movement of the drum also acting through the lever 185 and rod 180 to free the brake spring 72 and so again apply the brake for instantaneous final stoppage in the desired position. During the same action the drum cam groove will force the follower down and eventually out of the groove, but not until the drum has been moved all the way back to initial position, with a slight further travel; the follower when forced out of the groove being supplementally depressed and latched down by its control lever contact 170, which in the meanwhile has been released by the rightward movement of drum. The drum itself, as soon as it has reached initial position becomes latched against repeated leftward movement, namely, by the main latch lever 147 springing forward into position inside of the drum right flange 126. The drum however, as stated, is given a slight over-travel in this return movement, finally returning leftward to the initial position shown in the figures. This slight over-travel and corresponding return movement is utilized for the restoring and resetting of the brake connections; all the other parts having already been reset as described. The rightward overtravel movement of the drum swings up the brake latch carrying lever 78, and thus lifts the latch 74 to above the brake lever, and on the return these parts are thus restored to normal, the brake being latched open, but with the brake spring under full compression in readiness for the next stopping operation.

The depressing of the pedal to apply the main clutch 47 and restart the machine effects certain minor resetting actions. For example the latch 104 is pulled down below the finger 102 so that when subsequently let up it will operate as described. Also the finger 85 which subsequently throws the trip lever 75 is drawn downwardly by the depression of the pedal so as to let the trip lever bolt 82 shoot out above the finger, to be contacted and lifted in the subsequent stopping operation.

It will thus be seen that there has been described a stopping and starting mechanism embodying the principles and attaining the advantages of the present invention. Since many matters of combination, arrangement, design and detail may be modified without departing from the underlying principles it is not intended to limit the invention to such matters except so far as set forth in the appended claims.

What I claim is:

1. In a high speed power driven machine, a controller or pedal, a shaft, friction means operative upon pedal movement for disconnection of driving power for bringing the shaft preliminarily to a stop without shock in an indeterminate position, and power operated means brought into action by reason of such stoppage for turning the shaft at low speed to a predetermined position; said friction means having a latch normally holding it inoperative, a connection from the pedal for unlatching it, and means for restoring and relatching it.

2. In a high speed power driven machine, a shaft, friction brake means operative after disconnection of driving power for bringing the shaft preliminarily to a stop, and means acting after such stoppage for turning the shaft at low speed to a predetermined position comprising a drum rotated by power, and carrying a clutch member, a complementary clutch member on the shaft, a double acting resilient element or spring working at one point to apply the friction brake and at another point to shift the drum axially, a latch normally holding the drum from clutching engagement, means for releasing the latch upon preliminary stoppage, whereby the spring shifts the drum to apply the slow clutch, and means whereby such shift removes the brake pressure, and timed means for returning the drum to latched position thereby disengaging the slow drive and applying the friction brake for final stoppage.

3. In a high speed power driven machine, a shaft, means operative after disconnection of driving power for bringing the shaft preliminarily to a stop, and means acting after such stoppage for turning the shaft at low speed to a predetermined position comprising a drum rotated by power, and carrying a clutch member, a complementary clutch member on the shaft, means to shift the drum axially to apply the clutch, and timed means for returning the drum, comprising a cam groove in the drum, a follower, a latch member normally holding the follower retracted, and connections whereby the drum in moving into clutching engagement, shifts the latch member to release the follower, and in returning releases the latch member.

4. The combination as in claim 3 and wherein the drum cam groove is shaped to cam the follower outwardly, and the latch member arranged to draw it further outwardly on the return movement of the drum.

5. In a high speed power driven machine, a shaft, friction means operative after disconnection of driving power for bringing the shaft preliminarily to a stop, and means acting after such stoppage for turning the shaft at low speed to a predetermined position comprising a drum rotated by power, and carrying a clutch member, a complementary clutch member on the shaft, a spring working to apply the friction, a latch normally holding the drum from clutching engagement, means for releasing the latch upon preliminary stoppage, means for shifting the drum axially to engage the slow clutch, means for returning the drum to and beyond normal position and back to normal position, and connections operated from the drum during its movement beyond normal for resetting the friction spring.

6. The combination as in claim 5 and wherein the friction is normally held open by a latch, and the resetting means comprising means to put the spring under strain and relatch it.

7. The combination as in claim 5 and wherein the friction is normally held open by a latch, and the resetting means comprises means to put the spring under strain and relatch it, by an abnormal movement of the drum and latch movement.

8. In a high speed power driven machine, a shaft, friction means operative after disconnection of driving power for bringing the shaft preliminarily to a stop without shock in an indeterminate position, said means arranged to yield resiliently during the stoppage and resiliently return to position thereafter, a guard holding the parts in their position after their return movement, and power operated means put into action by such return movement for turning the shaft at low speed to a predetermined position.

9. The combination as in claim 8 and wherein are means, as latch 104 and finger 96, to retract such guard and to release it subsequent to the application of the friction but before the reaction.

10. In a high speed power driven machine, a shaft, friction means operative after disconnection of driving power for bringing the shaft preliminarily to a stop without shock in an indeterminate position, said means arranged to yield during the stoppage and resiliently react thereafter, power operated means for turning the shaft forwardly at low speed to a predetermined position, a latch restraining the action thereof, and a connection whereby the reaction movement of the friction parts throws the latch to apply the slow drive.

11. The combination as in claim 10 and wherein the latch throwing connection comprises a contacting member shifted during the reaction, and having means camming it out of operative position during such shifting, and permitting it to be reshifted and restored on the subsequent yielding of the friction parts.

12. In a high speed power driven machine, a shaft, a friction brake, means operative after disconnection of driving power for applying the brake and bringing the shaft preliminarily to a stop without shock in an indeterminate position, power operated means acting after such stoppage for turning the shaft at low speed to a predetermined position and disengaging it, and means for again applying the brake.

13. The combination as in claim 12 and wherein the brake applying means operates through a spring, means operating to release the brake during the slow rotation, the means for releasing and again applying the brake operating to remove and then restore the braking pressure of such spring.

14. The combination as in claim 8 and wherein is a latch 104 arranged to retract the guard upon disconection of power, and a finger 96 to shift the latch to release the guard during the frictional stoppage.

In testimony whereof I have affixed my signature hereto.

JOHN ROGER OLIVER.